United States Patent
Friedman

(10) Patent No.: US 8,854,557 B2
(45) Date of Patent: Oct. 7, 2014

(54) GESTURE-BASED REMOTE CONTROL

(71) Applicant: AT&T Intellectual Property I, L.P., Atlanta, GA (US)

(72) Inventor: Lee G. Friedman, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/088,147

(22) Filed: Nov. 22, 2013

(65) Prior Publication Data

US 2014/0078406 A1 Mar. 20, 2014

Related U.S. Application Data

(63) Continuation of application No. 12/579,602, filed on Oct. 15, 2009, now Pat. No. 8,593,576.

(51) Int. Cl.
*H04N 5/44* (2011.01)
*H04N 7/18* (2006.01)
*G05B 23/02* (2006.01)
*G05B 11/01* (2006.01)
*B60R 25/10* (2013.01)
*G09G 5/08* (2006.01)
*G06F 3/041* (2006.01)
*G09G 5/00* (2006.01)
*H04N 21/422* (2011.01)

(52) U.S. Cl.
CPC .. *H04N 21/42224* (2013.01); *H04N 2005/4428* (2013.01); *H04N 21/42204* (2013.01); *H04N 21/422* (2013.01); *H04N 21/42222* (2013.01)
USPC ........... 348/734; 348/77; 340/3.1; 340/12.28; 340/407.2; 345/158; 345/173; 345/156; 345/679

(58) Field of Classification Search
USPC ............. 340/825.22, 825.25, 825.69, 539.16, 340/539.19, 541, 5.1, 3.1, 12.78; 382/115, 382/118, 181, 203, 288; 348/734, 211.99; 345/156, 157, 121, 158, 173, 159
See application file for complete search history.

(56) References Cited

U.S. PATENT DOCUMENTS

| | | |
|---|---|---|
| 4,321,840 A | 3/1982 | Kalamon |
| 4,325,904 A | 4/1982 | Frankhouse |
| 4,331,041 A | 5/1982 | Bennett |
| 4,458,552 A | 7/1984 | Spease et al. |
| 4,590,819 A | 5/1986 | Spease et al. |
| 4,610,180 A | 9/1986 | Spease |
| 4,970,912 A | 11/1990 | Wolf |
| 5,014,569 A | 5/1991 | Kelley |
| 5,113,717 A | 5/1992 | Plamper |
| 5,142,933 A | 9/1992 | Kelley |
| 5,172,878 A | 12/1992 | Lederman |
| 5,440,946 A | 8/1995 | Adelman et al. |
| 5,570,611 A | 11/1996 | Pospisil et al. |

(Continued)

*Primary Examiner* — Jennifer Mehmood
*Assistant Examiner* — Mirza Alam
(74) *Attorney, Agent, or Firm* — Jackson Walker L.L.P.

(57) ABSTRACT

A method and system for operating a remote-controlled device using a gesture-enabled remote control (RC) includes activating a communication link between the RC and the remote-controlled device. The remote-controlled device may implement a remote control context accommodating gesture commands generated by the RC. The RC may enable a user to generate gesture commands by performing gesture motions with the RC. Command data corresponding to gesture commands, along with selection commands from selection control inputs on the RC, may be sent to the remote-controlled device.

20 Claims, 5 Drawing Sheets

(56) References Cited

U.S. PATENT DOCUMENTS

| | | |
|---|---|---|
| 5,724,858 A | 3/1998 | Polando |
| 6,603,420 B1 * | 8/2003 | Lu .................. 341/176 |
| D493,740 S | 8/2004 | George |
| 6,837,786 B2 | 1/2005 | Linde et al. |
| 7,197,228 B1 | 3/2007 | Monroe et al. |
| 7,359,622 B2 | 4/2008 | Monroe et al. |
| 7,428,368 B1 | 9/2008 | Monroe et al. |
| 7,584,071 B2 | 9/2009 | Lee |
| 7,597,027 B2 | 10/2009 | Kwon |
| 7,821,541 B2 | 10/2010 | Delean |
| 7,852,255 B2 | 12/2010 | Rapisarda |
| 7,976,006 B2 | 7/2011 | Frisque |
| 2001/0035860 A1 * | 11/2001 | Segal et al. .................. 345/173 |
| 2004/0137838 A1 | 7/2004 | Linde et al. |
| 2005/0073497 A1 | 4/2005 | Kim |
| 2005/0212767 A1 * | 9/2005 | Marvit et al. ................. 345/158 |
| 2005/0232579 A1 | 10/2005 | Monroe et al. |
| 2006/0037426 A1 | 2/2006 | Teller |
| 2007/0252898 A1 | 11/2007 | Delean |
| 2008/0231465 A1 | 9/2008 | Lee |
| 2008/0234971 A1 | 9/2008 | Lee |
| 2008/0316313 A1 | 12/2008 | Monroe et al. |
| 2009/0009469 A1 | 1/2009 | Hsu et al. |
| 2009/0033537 A1 | 2/2009 | Rapisarda |
| 2009/0069955 A1 | 3/2009 | Sheu |
| 2009/0080863 A1 | 3/2009 | Monroe et al. |
| 2009/0141184 A1 | 6/2009 | Gulati |
| 2009/0153288 A1 * | 6/2009 | Hope et al. ..................... 340/3.1 |
| 2009/0314123 A1 | 12/2009 | Kwon |
| 2010/0053458 A1 | 3/2010 | Anglin et al. |
| 2010/0060569 A1 * | 3/2010 | Shamilian .................... 345/156 |
| 2010/0171635 A1 * | 7/2010 | Chu ........................ 340/825.69 |
| 2010/0194028 A1 | 8/2010 | Frisque |
| 2010/0302357 A1 * | 12/2010 | Hsu et al. ........................ 348/77 |
| 2010/0306699 A1 | 12/2010 | Hsu et al. |
| 2011/0001699 A1 | 1/2011 | Jacobsen et al. |
| 2011/0058107 A1 | 3/2011 | Sun et al. |
| 2011/0095873 A1 | 4/2011 | Pratt et al. |

* cited by examiner

FIG. 5

| Gesture Motion 522 | Gesture Motion Name 524 | Gesture Command 526 | Remote Control Context 528 |
|---|---|---|---|
| 502 ←→ | Sweep Up or Down | Volume Up/Down; Channel Up/Down; Scroll Up/Down | Dynamic Volume Control; Dynamic Channel Change; List Navigation (EPG, DVR, etc.) |
| 504 ⇉ | Two Short Down Movements | Mute; Scroll Down N Rows | Dynamic Volume Control; List Navigation (EPG, DVR, etc.) |
| 506 ⇇ | Two Short Up Movements | Restore; Scroll Up N Rows | Dynamic Volume Control; List Navigation (EPG, DVR, etc.) |
| 508 ↕ | Sweep Left or Right | Scroll DVR Timeline; Scroll EPG | DVR Playback Timeline; List Navigation (EPG, DVR, etc.) |
| 510 ↑↑ | Two Short Right Movements | Fast Forward; Scroll + Time Forward (e.g., +12 hours) | DVR Playback Timeline; List Navigation (EPG, DVR, etc.) |
| 512 ↓↓ | Two Short Left Movements | Rewind; Scroll + Time Backward (e.g., -12 hours) | DVR Playback Timeline; List Navigation (EPG, DVR, etc.) |
| 514 ⤢⤡ | Diagonal Movement | Bring Up/Down Menu; Bring Up/Down EPG | TV Viewing, or Other Screen |
| 516 ↺ | In and Out | Page Flipping | EPG, Menu, VoD, Activities, etc. |
| 518 ↻ | Rotate Clockwise | Next Selection | List Navigation (EPG, DVR, etc.) |
| 520 ↺ | Rotate Counterclockwise | Previous Selection | List Navigation (EPG, DVR, etc.) |

GESTURE-BASED REMOTE CONTROL

The present patent application is a continuation of U.S. patent application Ser. No. 12/579,602, filed Oct. 15, 2009, the entirety of which is hereby incorporated by reference.

BACKGROUND

1. Field of the Disclosure

The present disclosure relates to remote control and, more particularly, to gesture-based remote control to operate a device.

2. Description of the Related Art

Remote controls provide convenient operation of equipment from a distance. Many consumer electronic devices are equipped with a variety of remote control features. Implementing numerous features on a remote control may result in a complex and inconvenient user interface.

BRIEF DESCRIPTION OF THE DRAWINGS

FIG. 5 is a table of selected embodiments of gesture commands.

DESCRIPTION OF THE EMBODIMENT(S)

Figure 1:
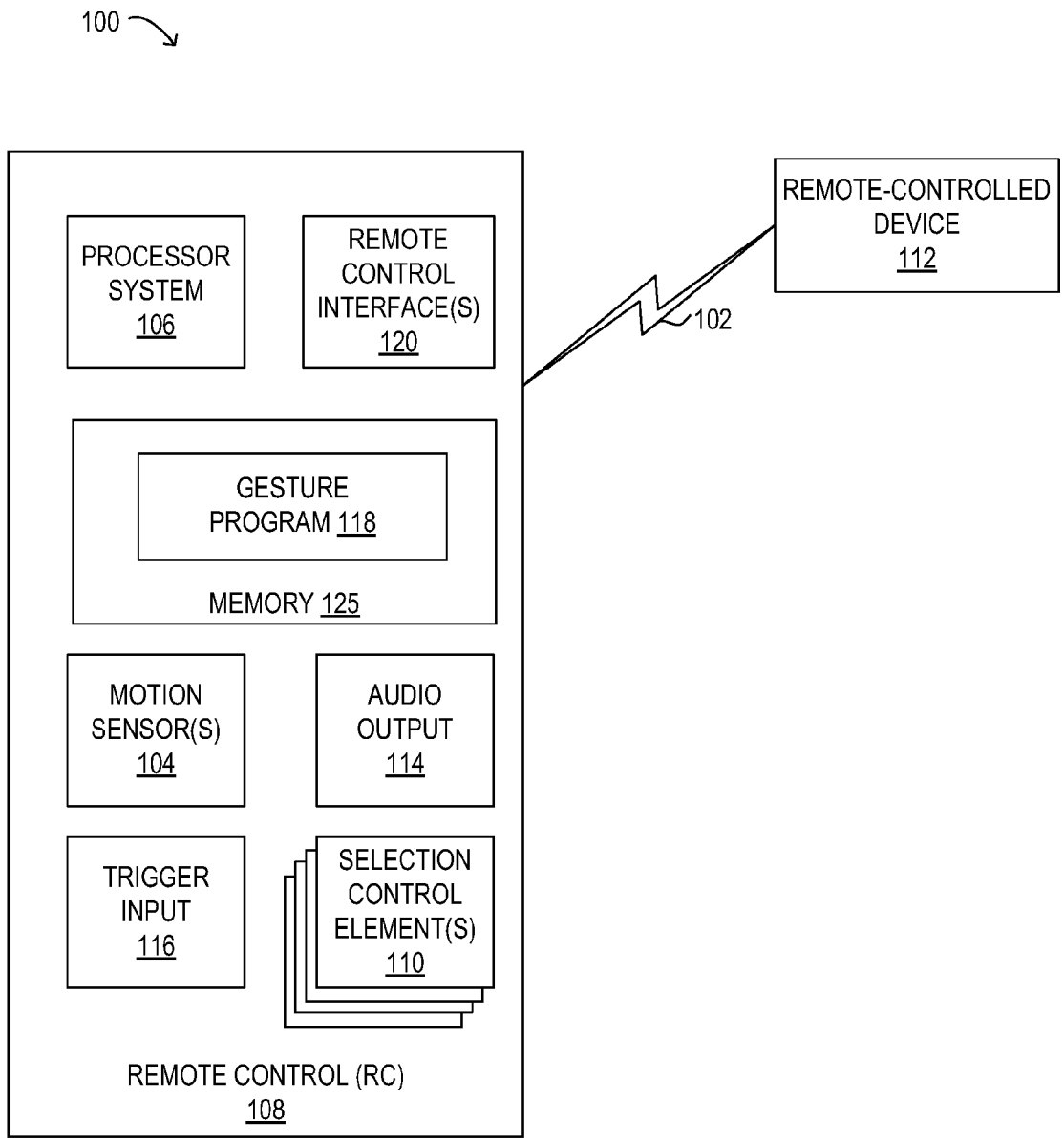
FIG. 1 is a block diagram of selected elements of an embodiment of a remote control system.

In one aspect, a disclosed remote control method includes activating a gesture sensor of a remote control (RC), sensing a gesture motion of the RC, converting the gesture motion into a gesture command executable by a remote-controlled device, and transmitting the gesture command to the remote-controlled device. The sensed gesture motion may include translation and/or rotation of the RC. In the method, the sensing may further include determining a spatial acceleration of the RC. The operation of activating of the gesture sensor may be responsive to assertion of a control element of the RC. In certain instances, operation of activating of the gesture sensor may be responsive to a signal received from a source external to the RC.

In certain embodiments, the method may further include sending a message to the remote-controlled device, and receiving an acknowledgement from the remote-controlled device. The method may also include receiving a selection input generated by a selection control element of the RC, and sending selection command data corresponding to the selection input to the remote-controlled device. The operation of receiving the selection input may be responsive to a menu display on the remote-controlled device.

In another aspect, a gesture-enabled RC includes a processor, a wireless transceiver, a motion detector, and memory media accessible to the processor. The memory media may include instructions executable by the processor to establish a communication channel between the RC and a remote-controlled device using the wireless transceiver. When a motion detector enable signal is asserted, the processor instructions may be executable to record a gesture motion of the RC using the motion detector. The processor instructions may further be executable to convert the recorded gesture motion into a gesture command executable by a remote-controlled device, and send command data corresponding to the gesture command to the remote-controlled device. The processor instructions to record may further include processor instructions executable to determine a spatial acceleration of the RC.

In particular embodiments, the RC may further include a selection control element, while the processor instructions are further executable to receive a selection input generated by the selection control element, and send selection command data corresponding to the selection input to the remote-controlled device. In some embodiments, the RC may include a trigger control element, while the processor instructions are further executable to assert the motion detector enable signal when the trigger control element is activated. The RC may further include processor instructions executable to receive the asserted motion detector enable signal from a source external to the RC.

In various embodiments, the RC may include an audio output element, while the processor instructions are further executable to output a first audio signal using the audio output element when a gesture motion is recorded. The RC may include processor instructions executable to output a second audio signal when the motion detector enable signal is asserted, and/or output a third audio signal when the remote-controlled device acknowledges execution of a command associated with command data received by the RC. The processor instructions to record the gesture motion may be executed in response to a remote control context on the remote-controlled device, while the gesture command sent to the remote-controlled device may depend on the remote control context along with the recorded gesture motion.

In a further aspect, a disclosed computer-readable memory media includes executable instructions for operating a remote-controlled device. The instructions may be executable to display a command menu responsive to gesture commands received from an RC, receive gesture command data from the RC corresponding to a gesture command recorded by the RC, and execute the gesture command.

In certain embodiments, the memory media may include instructions executable to receive selection command data from the RC corresponding to a selection command received at the RC, and execute the selection command. The memory media may further include instructions executable to output a multimedia signal in response to receiving selection command data and/or gesture command data. The memory media may still further include instructions executable to assert a gesture enable signal via a communication channel between the remote-controlled device and the RC, while the asserted gesture enable signal may indicate when gesture commands are allowed.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of an embodiment of remote-controlled system 100 are depicted. System 100 illustrates devices, interfaces and information that may be processed to enable RC 108 to control remote-controlled device 112. In system 100, remote-controlled device 112 represents any of a number of different types of devices that are remote-controlled, such as media players, televisions, or client-premises equipment (CPE) for multimedia content distribution networks (MCDNs), among others. As used herein, a "gesture" or "gesture motion" or "gesture command" refers to a particular motion, or sequences of motions, imparted to an RC by a user for the purpose of providing user input to the RC. The gesture motion may be a translation or a rotation or a combination thereof, in 2- or 3-dimensional space. Specific gesture motions may be defined and assigned to predetermined remote control commands. As will be described in detail herein, RC 108 may be configured to detect gesture motions and interpret the detected gesture motions as remote control commands executable by remote-controlled device 112. RC 108 may then send command data, including remote control commands, to remote-controlled device 112. Upon receiving command data from RC 108, remote-controlled device 112 may execute a remote control function corresponding to the remote control command. In this manner, a user of remote-controlled system 100 may be provided a simplified, yet flexible interface for operating remote-controlled device 112 using RC 108.

In FIG. 1, RC 108 is depicted communicating with remote-controlled device 112 via communication link 102. Communication link 102 may be a wireless or a mechanically connected interface, or some combination thereof.

As shown in FIG. 1, RC 108, which may be a hand-held and manually operated device, includes numerous elements, and may include additional elements (not shown in FIG. 1) in various embodiments. RC 108 is shown including processor system 106, RC interface 120, memory 125, motion sensor(s) 104, audio output 114, trigger input 116, and selection control element(s) 110. Memory 125 is depicted in FIG. 1 including gesture program 118. Accordingly, RC 108 may comprise elements configured to function as an embodiment of an electronic device capable of executing program instructions. RC 108 may further include at least one shared bus (not shown in FIG. 1) for interconnectivity among internal elements, such as those depicted in FIG. 1.

Processor system 106 may represent at least one processing unit and may further include internal memory, such as a cache for storing processor executable instructions. In certain embodiments, processor system 106 serves as a main controller for RC 108. In various embodiments, processor system 106 is operable to perform remote control operations, including gesture detection and processing operation, as described herein.

In FIG. 1, remote control interface(s) 120 may represent a communications transceiver providing an interface for any of a number of communication links. In certain embodiments, remote control interface(s) 120 supports wireless communication links, such as infrared (IR), radio-frequency (RF), and audio, among others. Remote control interface(s) 120 may further support mechanically connected communication links to RCs, such as galvanically wired connections, and may accordingly include a physical adapter or receptacle for receiving such connections. In one embodiment, remote control interface(s) 120 transforms an instruction for operating remote-controlled device 112 into a signal sent via communication link 102. It is noted that remote control interface(s) 120 may be a bidirectional interface, such that responses, such as commands, information, or acknowledgements, may be received from remote-controlled device 112 via communication link 102. In one embodiment, a message may be sent to remote-controlled device 112 and an acknowledgement of the message may be received from remote-controlled device 112. The message may include command data, as will be described below.

Also in FIG. 1, memory 125 encompasses persistent and volatile media, fixed and removable media, magnetic and semiconductor media, or a combination thereof. Memory 125 is operable to store instructions, data, or both. Memory 125 as shown includes data, which may be in the form of sets or sequences of instructions, namely, gesture program 118. Gesture program 118 may include processor executable instructions to interpret gesture commands as remote control commands executable by remote-controlled device 112, as described herein.

RC 108, as depicted in FIG. 1, includes motion sensor(s) 104, which may be mechanically integrated into RC 108. Motion sensor(s) 104 may represent devices configured to detect linear translations, rotational translations, linear acceleration, rotational acceleration, or a combination thereof. For example, motion sensor(s) 104 may be configured to determine a spatial acceleration involving multiple axes of motion simultaneously. Motion sensor(s) 104 may include microelectromechanical systems (MEMS) or MEMS components, such as accelerometers, gyroscopes, or other types of motion sensors. It is noted that motion sensor(s) 104 may represent sensors configured to detect translation or rotation of RC 108 in multiple dimensions simultaneously.

In FIG. 1, RC 108 is shown including trigger input 116. In one embodiment, trigger input 116 may represent an electromechanical control element for activating a trigger or enable function for RC 108. In other embodiments, trigger input 116 may represent a signal input for receiving a trigger or enable signal from an external source. In one embodiment, the external source is a component of remote-controlled device 112, such that remote-controlled device 112 may provide both a remote control context and an enable signal for receiving gesture commands. In certain embodiments, the trigger or enable function asserts a motion sensor enable signal, which allows for gesture commands to be input by activating motion sensor(s) 104.

Also in FIG. 1, RC 108 is shown including audio output 114. Audio output 114 may represent an audio device, such as a loudspeaker, that is integrated in RC 108. In some embodiments, audio output 114 represents an output port for an external audio device, such as an audio plug for connecting headphones.

Further depicted in FIG. 1 are selection control element(s) 110, representing a variety of input control elements integrated into RC 108. Selection control element(s) 110 may be buttons, sliders, switches or other types of electromechanical input devices. For example, selection control element(s) 110 may include power control elements for powering RC 108 on or off. Selection control element(s) 110 may additionally include control elements that generate remote control commands executable by remote-controlled device 112, such as, but not limited to, info, play, pause, guide, purchase, browse, etc. In certain embodiments, selection control element(s) 110 may include control elements associated with a remote control context (not shown in FIG. 1) executing on remote-controlled device 112. The remote control context may be in the form of a displayed menu structure that is responsive to selection control element(s) 110. In particular, selection control element(s) 110 may include functionality to select an activated item in the remote control context. It is noted that remote control commands generated by selection control element(s) 110 may be used in conjunction with gesture commands and may accordingly be processed by gesture program 118.

In certain embodiments, RC 108 may further include a display element (not shown in FIG. 1), which may represent a display device implemented as a liquid crystal display screen, a computer monitor, a television, a touch screen device, or the like. The display element may comply with a display standard for the corresponding type of display. Standards for computer monitors include analog standards such as video graphics array (VGA), extended graphics array (XGA), etc., or digital standards such as digital visual interface (DVI)

or high-definition multimedia interface (HDMI), among others. A television display may comply with standards such as National Television System Committee (NTSC), Phase Alternating Line (PAL), or another suitable standard.

In operation, RC 108, after power on and/or activation of remote control interface(s) 120, may be enabled for gesture commands, for example, by trigger input 116 asserting a gesture enable signal. In one embodiment, a remote control context is displayed on remote-controlled device 112, which, in response, may generate gesture commands from gesture motions detected by RC 108. In other embodiments, a gesture command may be generated without a remote control context being explicitly displayed by remote-controlled device 112. Command data corresponding to the gesture command, along with any selection control input, may be sent to remote-controlled device 112 for execution. Remote-controlled device 112 may optionally send an acknowledgement of an executed and/or received remote control command to RC 108.

It is further noted that audio output 114 may output audio signals corresponding to various events or actions in a remote control operation. For example, audio output 114 may output an audio signal when the motion detector enable signal is asserted, thus providing audio feedback to the user that gesture commands may be performed at such time. Audio output 114 may further output another audio signal when a gesture motion is recorded by RC 108, thus providing audio feedback to the user that a gesture command was generated. Audio output 114 may still further output yet another audio signal when remote-controlled device 112 acknowledges execution of a command associated with command data received by remote-controlled device 112, thus providing audio feedback to the user that a gesture command was actually executed.

Figure 2:
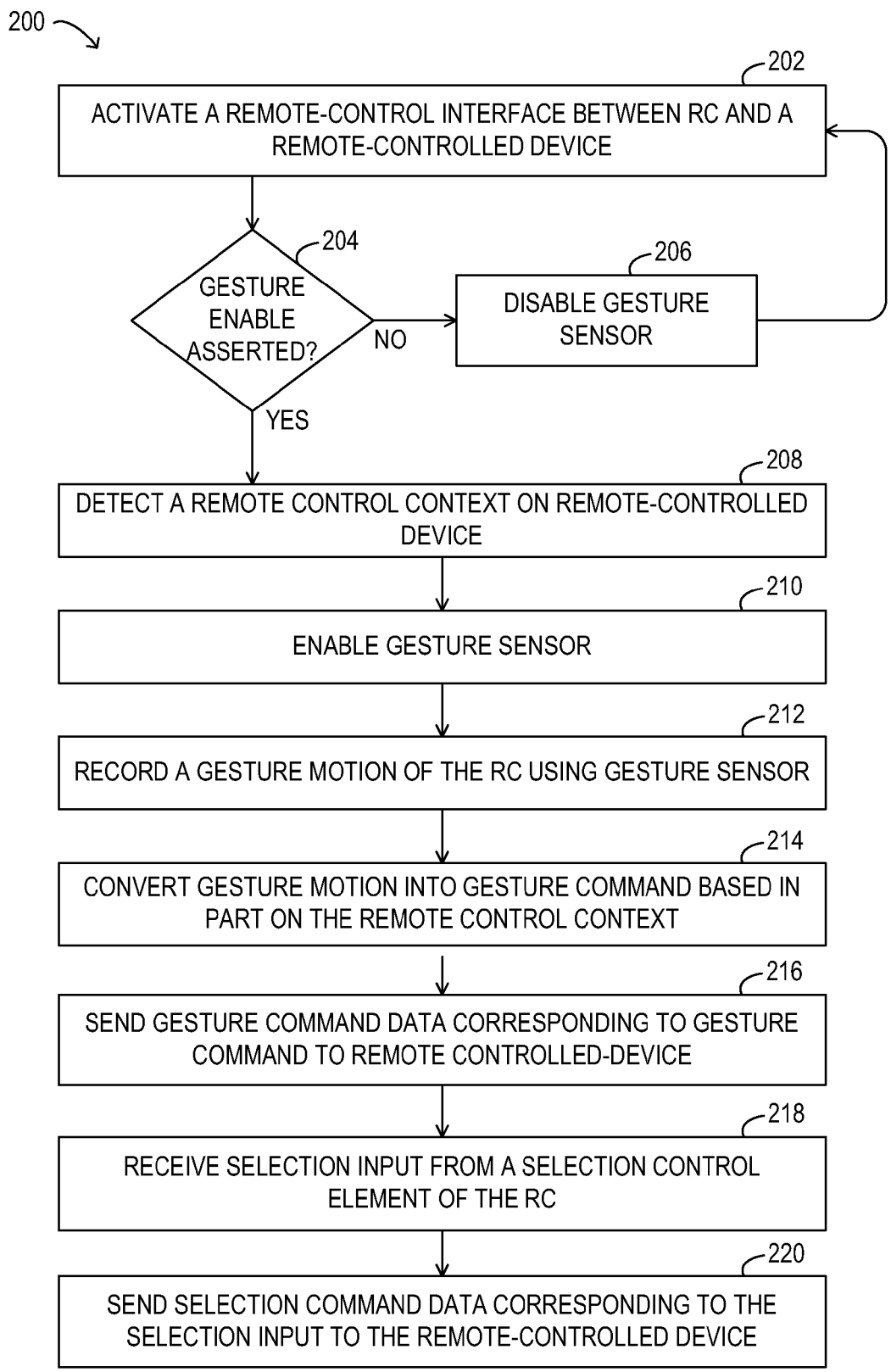
FIG. 2 illustrates an embodiment of a method for operating a remote control.

Turning now to FIG. 2, an embodiment of method 200 for remote control is illustrated. In one embodiment, method 200 is performed by gesture program 118 executing on RC 108. It is noted that certain operations described in method 200 may be optional or may be rearranged in different embodiments.

Method 200 may begin by activating a remote control interface between an RC and a remote-controlled device (operation 202). The activation may involve power up of an RC. In some embodiments, the activation includes bidirectional communication between the RC and the remote-controlled device.

Method 200 may proceed by making a decision whether a gesture enable is asserted (operation 204). The gesture enable may be an input signal to the RC. If the result of the decision in operation 204 is NO, then a gesture sensor may be disabled (operation 206). The gesture sensor may be a motion sensor, such as motion sensor(s) 104, described above with respect to FIG. 1. If the result of the decision in operation 204 is YES, then a remote control context on the remote-controlled device may be detected (operation 208). The remote control context may be associated with a display of menu options or navigation elements on a user interface of the remote-controlled device. In one example, the remote control context is associated with an electronic program guide (EPG) displayed by the remote-controlled device (see FIG. 4).

Next, the gesture sensor may be enabled (operation 210). A gesture motion of the RC may be recorded using the gesture sensor (operation 212). In certain instances, a user of the RC may be prompted to provide the gesture motion, for example, from within the remote control context. The user may create the gesture motion with translative or rotational body movements, which impart motion to the RC, for example, by holding the RC in the user's hand. The gesture motion may be converted into a gesture command, based in part on the remote control context (operation 214). The gesture motion may be interpreted as a spatial pattern, and referenced to a list, or look-up-table, of known spatial patterns, which may, in turn, be correlated to specific gesture commands. For example, a sharp downwards movement may be interpreted as a 'pause' command. Other remote control commands may similarly be referenced to particular gesture motions or patterns. The gesture motion may further be correlated with the spatial arrangement of display elements in the remote control context. In this manner, the remote control context may facilitate an intuitive remote control environment, with ease of use and ease of learning to use.

In method 200, gesture command data corresponding to the gesture command may then be sent to the remote-controlled device (operation 216). The gesture command data may be encoded, encrypted, or otherwise transformed into a code interpretable and/or executable by the remote-controlled device. A selection input from a selection control element of the RC may be received (operation 218). The selection input may be a response to a command selection in the remote control context, in conjunction with previously entered gesture commands. Selection command data corresponding to the selection input may be sent to the remote-controlled device (operation 220). The selection command data may be substantially similar to the gesture command data sent to the remote-control device in operation 216.

Figure 3:
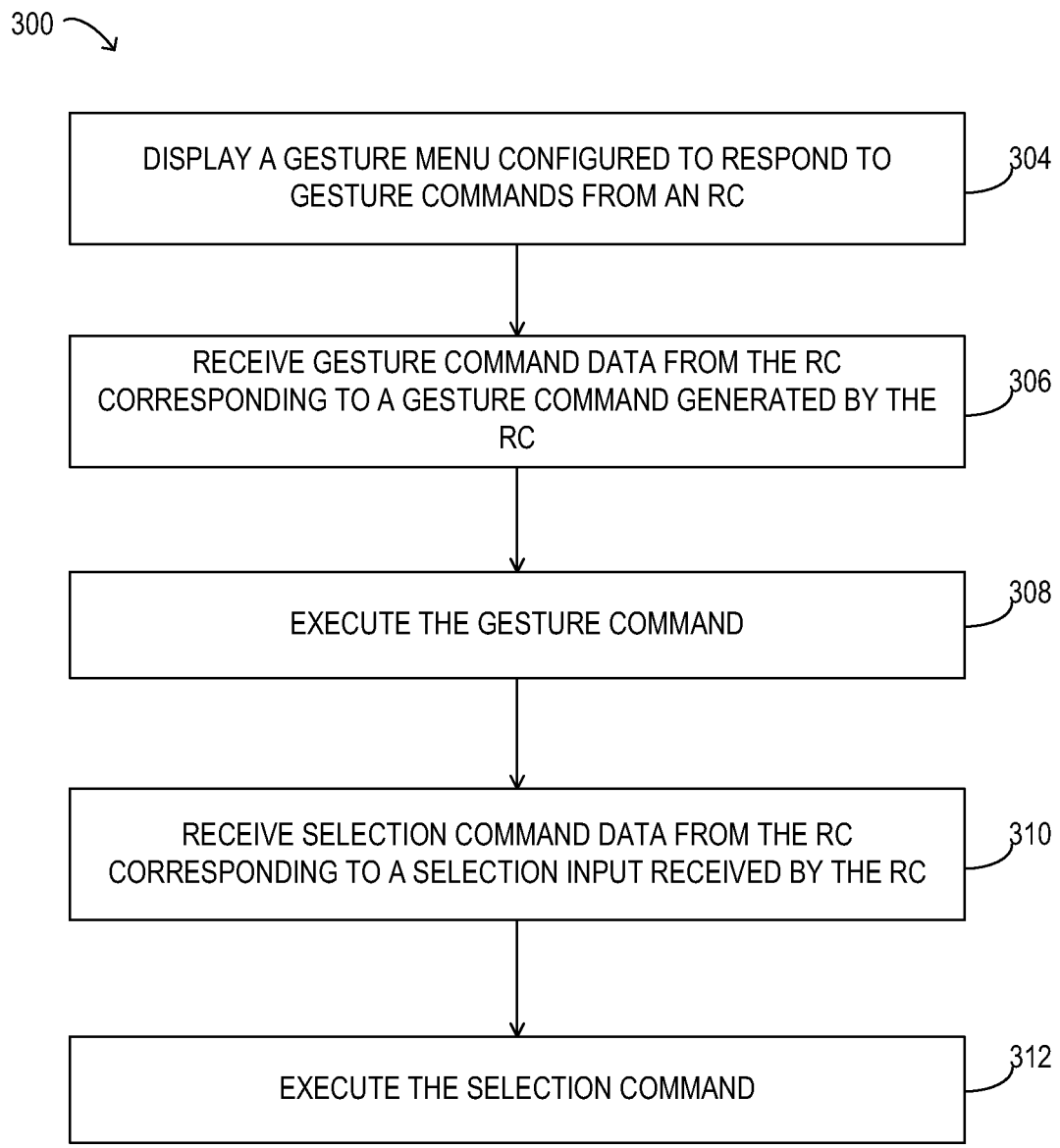
FIG. 3 illustrates an embodiment of a method for operating a remote control.

Turning now to FIG. 3, an embodiment of method 300 for remotely control is illustrated. In one embodiment, method 300 is performed by remote control 414 (see FIG. 4) executing on remote-controlled device 112. It is noted that certain operations described in method 300 may be optional or may be rearranged in different embodiments.

Method 300 may begin by displaying a gesture menu configured to respond to gesture commands from an RC (operation 304). The gesture menu may be included in an implementation of a remote control context. Gesture command data, corresponding to a gesture command generated by the RC, may be received from the RC (operation 306). The remote-controlled device may output a multimedia signal in response to receiving gesture command data. The gesture command may then be executed (operation 308). The gesture command may be associated with a remote control function executable by a remote-controlled device within the remote control context. Selection command data, corresponding to a selection input received by the RC, may be received from the RC (operation 310). The remote-controlled device may output a multimedia signal in response to receiving selection command data. The selection command may then be executed (operation 312). The selection command may also be associated with a remote control function executable by the remote-controlled device within the remote control context.

Figure 4:
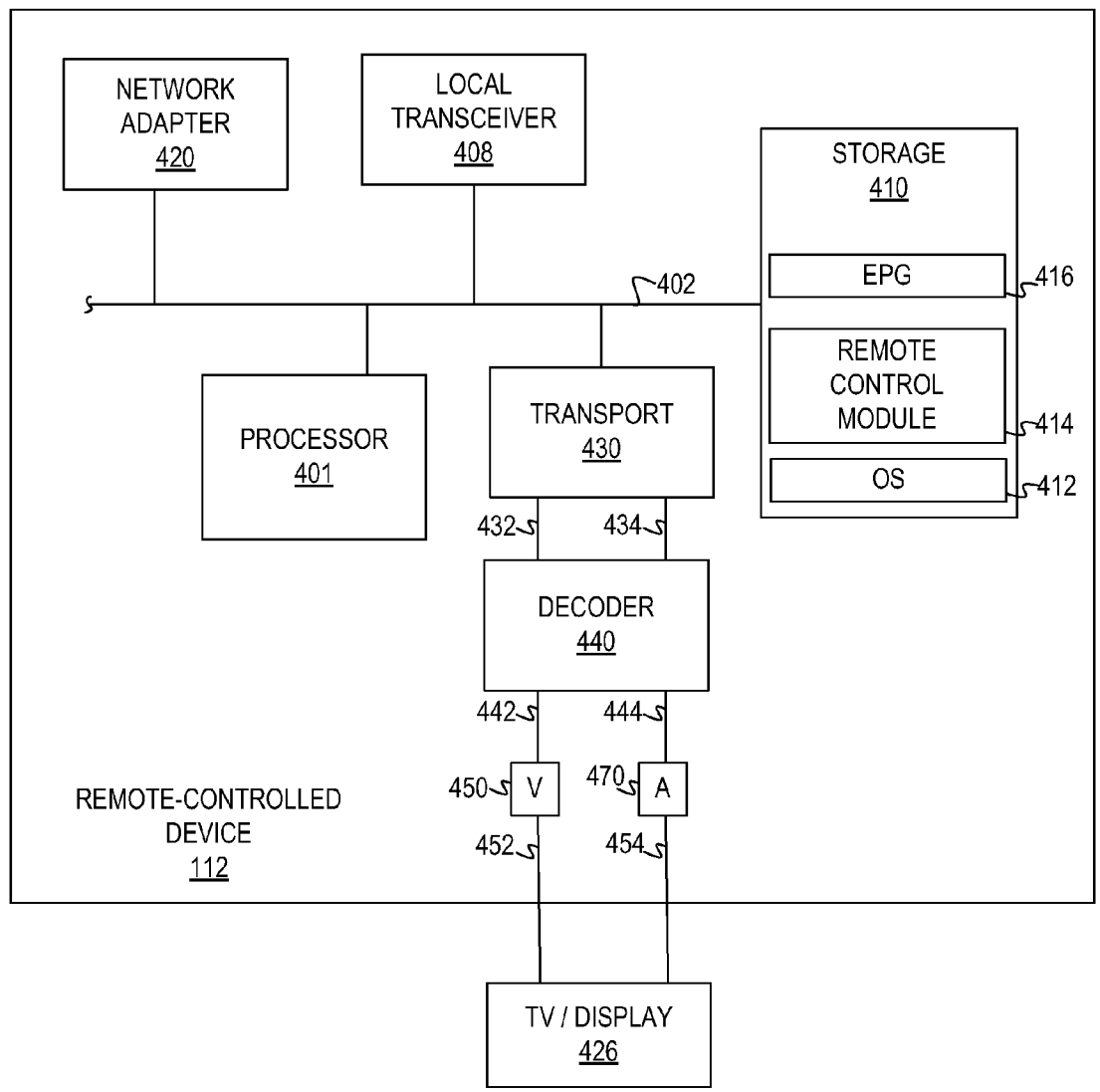
FIG. 4 is a block diagram of selected elements of an embodiment of a remote-controlled device.

Referring now to FIG. 4, a block diagram illustrating selected elements of an embodiment of remote-controlled device 112 is presented. As noted previously, remote-controlled device 112 may represent any of a number of different types of devices that are remote-controlled, such as media players, televisions, or CPE for MCDNs, among others. In FIG. 4, remote-controlled device 112 is shown as a functional component along with display 426, independent of any physical implementation, and may be any combination of elements of remote-controlled device 112 and display 426.

In the embodiment depicted in FIG. 4, remote-controlled device 112 includes processor 401 coupled via shared bus 402 to storage media collectively identified as storage 410. Remote-controlled device 112, as depicted in FIG. 4, further includes network adapter 420 that may interface remote-controlled device 112 to a local area network (LAN) through which remote-controlled device 112 may receive and send multimedia content (not shown in FIG. 4). Network adapter 420 may further enable connectivity to a wide area network (WAN) for receiving and sending multimedia content via an access network (not shown in FIG. 4).

In embodiments suitable for use in IP based content delivery networks, remote-controlled device 112, as depicted in FIG. 4, may include transport unit 430 that assembles the payloads from a sequence or set of network packets into a stream of multimedia content. In coaxial based access networks, content may be delivered as a stream that is not packet based and it may not be necessary in these embodiments to include transport unit 430. In a co-axial implementation, however, tuning resources (not explicitly depicted in FIG. 4) may be required to "filter" desired content from other content that is delivered over the coaxial medium simultaneously and these tuners may be provided in remote-controlled device 112. The stream of multimedia content received by transport unit 430 may include audio information and video information and transport unit 430 may parse or segregate the two to generate video stream 432 and audio stream 434 as shown.

Video and audio streams 432 and 434, as output from transport unit 430, may include audio or video information that is compressed, encrypted, or both. A decoder unit 440 is shown as receiving video and audio streams 432 and 434 and generating native format video and audio streams 442 and 444. Decoder 440 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 440 may employ any of various audio decoding algorithms including Dolby® Digital, Digital Theatre System (DTS) Coherent Acoustics, and Windows Media Audio (WMA).

The native format video and audio streams 442 and 444 as shown in FIG. 4 may be processed by encoders/digital-to-analog converters (encoders/DACs) 450 and 470 respectively to produce analog video and audio signals 452 and 454 in a format compliant with display 426, which itself may not be a part of remote-controlled device 112. Display 426 may comply with NTSC, PAL or any other suitable television standard.

Storage 410 encompasses persistent and volatile media, fixed and removable media, and magnetic and semiconductor media. Storage 410 is operable to store instructions, data, or both. Storage 410 as shown may include sets or sequences of instructions, namely, an operating system 412, a remote control application program identified as remote control module 414, and EPG 416. Operating system 412 may be a UNIX or UNIX-like operating system, a Windows® family operating system, or another suitable operating system. In some embodiments, storage 410 is configured to store and execute instructions provided as services by an application server via the WAN (not shown in FIG. 4).

EPG 416 represents a guide to multimedia content available for viewing using remote-controlled device 112, and may be shown to the user as an element of the user interface. The user interface may include a plurality of menu items arranged according to one or more menu layouts, which enable a user to operate remote-controlled device 112. The user may operate the user interface, including EPG 416, using RC 108 (see FIG. 1) in conjunction with remote control module 414. In some embodiments, EPG 416 may include an implementation of a remote control context, as described above.

Local transceiver 408 represents an interface of remote-controlled device 112 for communicating with external devices, such as RC 108 (see FIG. 1), or another remote control device. Local transceiver 408 may provide a mechanical interface for coupling to an external device, such as a plug, socket, or other proximal adapter. In some cases, local transceiver 408 is a wireless transceiver, configured to send and receive IR or RF or other signals. Local transceiver 408 may be accessed by remote control module 414 for providing remote control functionality.

Turning now to FIG. 5, table 500 shows selected embodiments of gesture commands, such as those generated by RC 108. Table 500 depicts exemplary embodiments of gesture motions and their respective gesture commands, which may be modified in other implementations. In table 500, gesture motion column 522 indicates a gesture motion associated with a gesture command; gesture motion name column 524 is a name of the gesture motion in gesture motion column 522; gesture command column 526 is a gesture command interpreted from the gesture motion in gesture motion column 522; and remote control context 528 is an example of a usage environment in which the respective gesture command may be used. Rows 502-520 in table 500 represent exemplary instances of gesture motions and their associated gesture commands.

Row 502 shows a sweep up or down gesture command usable to adjust volume level up or down, increment/decrement channels, or otherwise scroll up or down, which may be applicable for dynamic volume control, dynamic channel control, or list navigation in an EPG, DVR, or another menu list. Row 504 shows a gesture command involving two short down movements, usable to mute volume or scroll down a number of rows, which may be applicable for dynamic volume control or list navigation in an EPG, DVR, or another menu list. Row 506 shows gesture command involving two short up movements, usable to restore volume or scroll up a number of rows, which may be applicable for dynamic volume control or list navigation in an EPG, DVR, or another menu list. Row 508 shows a sweep left or right gesture command, usable to scroll a DVR timeline or scroll an EPG, which may be applicable for a DVR playback timeline menu or list navigation in an EPG, DVR, or another menu list. Row 510 shows a gesture command involving two short right movements, usable to fast forward or scroll with a time forward (e.g., plus 12 hours), which may be applicable for a DVR playback timeline menu or list navigation in an EPG, DVR, or another menu list. Row 512 shows a gesture command involving two short left movements, usable to reverse or scroll with a time backward (e.g., minus 12 hours), which may be applicable for a DVR playback timeline menu or list navigation in an EPG, DVR, or another menu list. Row 514 shows a diagonal movement gesture command, usable to bring a menu up or down, or bring an EPG up or down, which may be applicable during IPTV viewing or another screen environment. Row 516 shows an in or out gesture command, usable to flip pages, which may be applicable for an EPG, a menu environment, VoD, activities, web pages, or other environments. Row 518 shows a rotate clockwise gesture command, usable for advancing to a next selection, which may be applicable for list navigation in an EPG, DVR, or another menu list. Row 520 shows a rotate counterclockwise gesture command, usable for returning to a previous selection, which may be applicable for list navigation in an EPG, DVR, or another menu list.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A remote control method, comprising:
sensing motion of a remote control;
determining, from a set of predetermined spatial patterns, a spatial pattern associated with the motion, wherein the set of predetermined spatial patterns includes a single up pattern corresponding to a single up movement of the remote control and a single down pattern corresponding to a single down movement of the remote control;
detecting, from a set of predetermined contexts, a context of a remote controlled device, wherein the set of predetermined contexts includes a volume control context and a channel control context;
identifying, based on the spatial pattern and the context, a gesture command; and
wirelessly transmitting the gesture command;
wherein the single up pattern corresponds to:
a volume up command in the volume control context; and
a channel up command in the channel change context; and
wherein the single down pattern corresponds to:
a volume down command in the volume control context; and
a channel down command in the channel change context.

2. The method of claim 1, wherein:
the set of predetermined spatial patterns includes a multiple up pattern and a multiple down pattern; and
the multiple down pattern corresponds to a mute volume command and the multiple up pattern corresponds to a restore volume command in the volume control context.

3. The method of claim 1, wherein:
the predetermined set of contexts includes a video playback context;
the set of predetermined spatial patterns includes a multiple right pattern corresponding to multiple rightward movements of the remote control and a multiple left pattern corresponding to multiple leftward movements of the remote control; and
the multiple right pattern corresponds to a fast forward command in the video playback context and the multiple left pattern corresponds to a rewind command in the video playback context.

4. The method of claim 1, wherein:
the predetermined set of contexts includes a menu navigation context;
the set of predetermined spatial patterns includes a single right pattern corresponding to a single rightward movement of the remote control and a single left pattern corresponding to a single leftward movement of the remote control; and
the single right pattern corresponds to a scroll right command in the menu navigation context and the single left pattern corresponds to a scroll left command in the menu navigation context.

5. The method of claim 4, wherein:
the set of predetermined spatial patterns includes a diagonal pattern corresponding to diagonal movement of the remote control; and
the diagonal pattern corresponds to a menu toggle command to bring up or close a menu.

6. The method of claim 4, wherein:
the set of predetermined spatial patterns includes a clockwise rotation pattern corresponding to clockwise circular movement of the remote control and a counterclockwise rotation pattern corresponding to counterclockwise circular movement of the remote control; and
the clockwise pattern corresponds to a next selection command and the counterclockwise pattern corresponds to a previous selection command in the menu navigation context.

7. The method of claim 1, further comprising:
activating a gesture sensor of the remote control in response to detecting user assertion of a gesture enable input.

8. The method of claim 1, wherein sensing motion includes sensing at least one of: linear acceleration and rotational acceleration.

9. A remote control device, comprising:
a processor;
a wireless transmitter;
a motion sensor; and
a non-transitory computer readable medium including processor executable instructions that, when executed by the processor, cause the processor to perform operations, comprising: sensing motion of a remote control;
determining, from a set of predetermined spatial patterns, a spatial pattern associated with the motion, wherein the set of predetermined spatial patterns includes a single up pattern corresponding to a single up movement of the remote control and a single down pattern corresponding to a single down movement of the remote control;
detecting, from a set of predetermined contexts, a context of a remote controlled device, wherein the set of predetermined contexts includes a volume control context and a channel control context;
identifying, based on the spatial pattern and the context, a gesture command; and wirelessly transmitting the gesture command;
wherein the single up pattern corresponds to: a volume up command in the volume control context; and
a channel up command in the channel change context; and
wherein the single down pattern corresponds to: a volume down command in the volume control context; and
a channel down command in the channel change context.

10. The remote control device of claim 9, wherein:
the set of predetermined spatial patterns includes a multiple up pattern and a multiple down pattern; and
the multiple down pattern corresponds to a mute volume command and the multiple up pattern corresponds to a restore volume command in the volume control context.

11. The remote control device of claim 9, wherein:
the predetermined set of contexts includes a video playback context;
the set of predetermined spatial patterns includes a multiple right pattern corresponding to multiple rightward movements of the remote control and a multiple left pattern corresponding to multiple leftward movements of the remote control; and
the multiple right pattern corresponds to a fast forward command in the video playback context and the multiple left pattern corresponds to a rewind command in the video playback context.

12. The remote control device of claim 9, wherein:
the predetermined set of contexts includes a menu navigation context;
the set of predetermined spatial patterns includes a single right pattern corresponding to a single rightward movement of the remote control and a single left pattern corresponding to a single leftward movement of the remote control; and the single right pattern corresponds to a scroll right command in the menu navigation context and the single left pattern corresponds to a scroll left command in the menu navigation context.

13. The remote control device of claim 12, wherein:
the set of predetermined spatial patterns includes a diagonal pattern corresponding to diagonal movement of the remote control; and
the diagonal pattern corresponds to a menu toggle command to bring up or close a menu.

14. The remote control device of claim 12, wherein:
the set of predetermined spatial patterns includes a clockwise rotation pattern corresponding to clockwise circular movement of the remote control and a counterclockwise rotation pattern corresponding to counterclockwise circular movement of the remote control; and
the clockwise pattern corresponds to a next selection command and the counterclockwise pattern corresponds to a previous selection command in the menu navigation context.

15. A non-transitory computer readable memory including processor executable instructions that, when executed by a processor, cause the processor to perform operations comprising:
sensing motion of a remote control;
determining, from a set of predetermined spatial patterns, a spatial pattern associated with the motion, wherein the set of predetermined spatial patterns includes a single up pattern corresponding to a single up movement of the remote control and a single down pattern corresponding to a single down movement of the remote control;
detecting, from a set of predetermined contexts, a context of a remote controlled device, wherein the set of predetermined contexts includes a volume control context and a channel control context;
identifying, based on the spatial pattern and the context, a gesture command; and
wirelessly transmitting the gesture command; wherein the single up pattern corresponds to:
a volume up command in the volume control context; and
a channel up command in the channel change context; and
wherein the single down pattern corresponds to:
a volume down command in the volume control context; and
a channel down command in the channel change context.

16. The non-transitory computer readable memory of claim 15, wherein: the set of predetermined spatial patterns includes a multiple up pattern and a multiple down pattern; and
the multiple down pattern corresponds to a mute volume command and the multiple up pattern corresponds to a restore volume command in the volume control context.

17. The non-transitory computer readable memory of claim 15, wherein: the predetermined set of contexts includes a video playback context;
the set of predetermined spatial patterns includes a multiple right pattern corresponding to multiple rightward movements of the remote control and a multiple left pattern corresponding to multiple leftward movements of the remote control; and
the multiple right pattern corresponds to a fast forward command in the video playback context and the multiple left pattern corresponds to a rewind command in the video playback context.

18. The non-transitory computer readable memory of claim 15, wherein: the predetermined set of contexts includes a menu navigation context;
the set of predetermined spatial patterns includes a single right pattern corresponding to a single rightward movement of the remote control and a single left pattern corresponding to a single leftward movement of the remote control; and
the single right pattern corresponds to a scroll right command in the menu navigation context and the single left pattern corresponds to a scroll left command in the menu navigation context.

19. The non-transitory computer readable memory of claim 18, wherein: the set of predetermined spatial patterns includes a diagonal pattern corresponding to diagonal movement of the remote control; and
the diagonal pattern corresponds to a menu toggle command to bring up or close a menu.

20. The non-transitory computer readable memory of claim 18, wherein: the set of predetermined spatial patterns includes a clockwise rotation pattern corresponding to clockwise circular movement of the remote control and a counterclockwise rotation pattern corresponding to counterclockwise circular movement of the remote control; and
the clockwise pattern corresponds to a next selection command and the counterclockwise pattern corresponds to a previous selection command in the menu navigation context.

* * * * *